Figure 1:
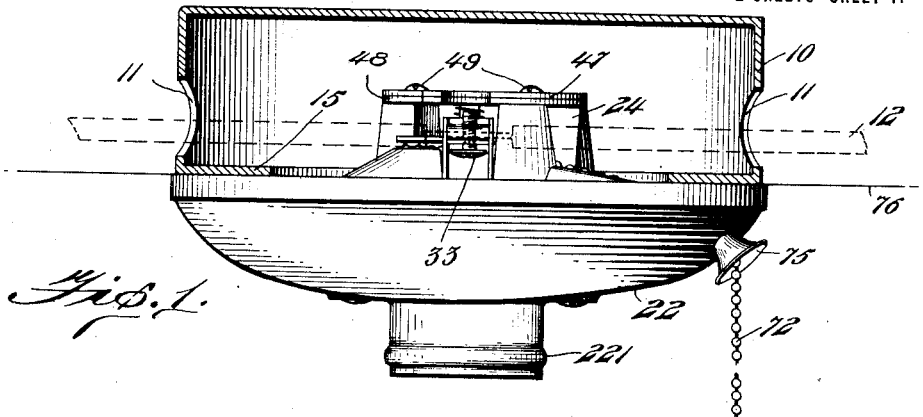

H. J. MOREY.
CONDUIT BOX RECEPTACLE.
APPLICATION FILED SEPT. 17, 1913.

1,214,353.

Patented Jan. 30, 1917.
2 SHEETS—SHEET 1.

Witnesses

Inventor
Harry J. Morey,
by
Attorneys

H. J. MOREY.
CONDUIT BOX RECEPTACLE.
APPLICATION FILED SEPT. 17, 1913.
1,214,353.
Patented Jan. 30, 1917.
2 SHEETS—SHEET 2.
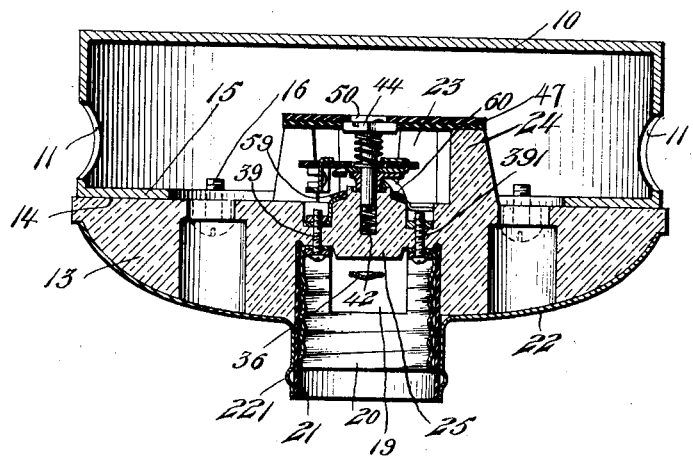
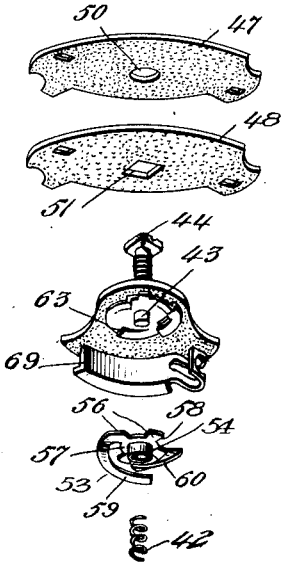
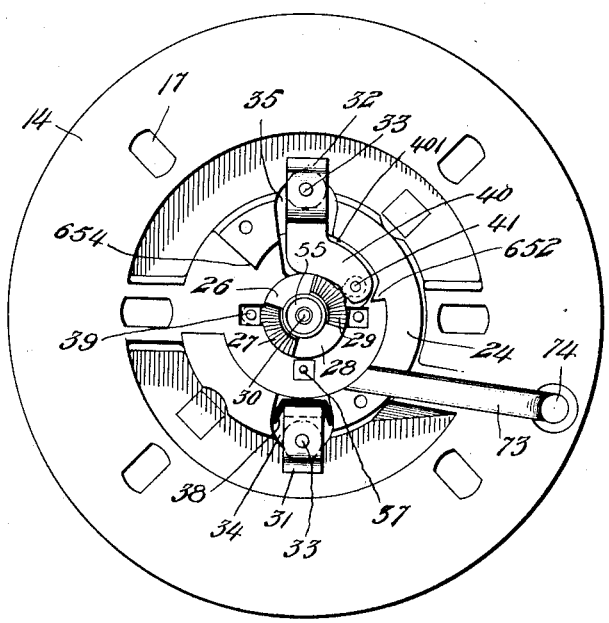
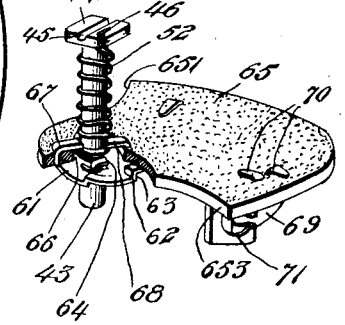
Witnesses
Inventor
Harry J. Morey,
by Foster, Freeman, Watson & Coit
Attorneys

UNITED STATES PATENT OFFICE.

HARRY J. MOREY, OF SYRACUSE, NEW YORK.

CONDUIT-BOX RECEPTACLE.

1,214,353.    Specification of Letters Patent.    Patented Jan. 30, 1917.

Application filed September 17, 1913.   Serial No. 790,287.

*To all whom it may concern:*

Be it known that I, HARRY J. MOREY, a citizen of the United States, and resident of Syracuse, county of Onondaga, State of New York, have invented certain new and useful Improvements in Conduit-Box Receptacles, of which the following is a specification.

This invention relates to receptacles for incandescent lamps, plugs and similar electrical devices, and has particular reference to pull-chain receptacles for use on conduit or outlet boxes.

The principal object of the invention is to provide a suitable form of receptacle to enable the installation of lamps on outlet boxes so that they may be controlled by pull-switch mechanism mounted on the receptacle within the outlet box. This has the important advantage over the present types of receptacles in that the pull-switch mechanism may be operated by a cord of the necessary length and the lamps will at the same time not project as far from the ceiling as in the present forms of construction.

The present form of receptacle comprises essentially an improvement in the form of receptacle shown and described in the patent to J. S. Crossley, No. 994,980, of June 13, 1911.

The invention contemplates forming the insulating or porcelain base of the receptacle in the form of a cover for the outlet box and providing integral with said cover-base and on the inner side thereof, a series of rests for the fingers of a switch member. The switch mechanism is inclosed within a chamber on the inner side of the base within the outlet box and operable by means of a chain or cord which extends through a hole in the cover-base and depends from the receptacle at the side of the lamp.

Figure 2:
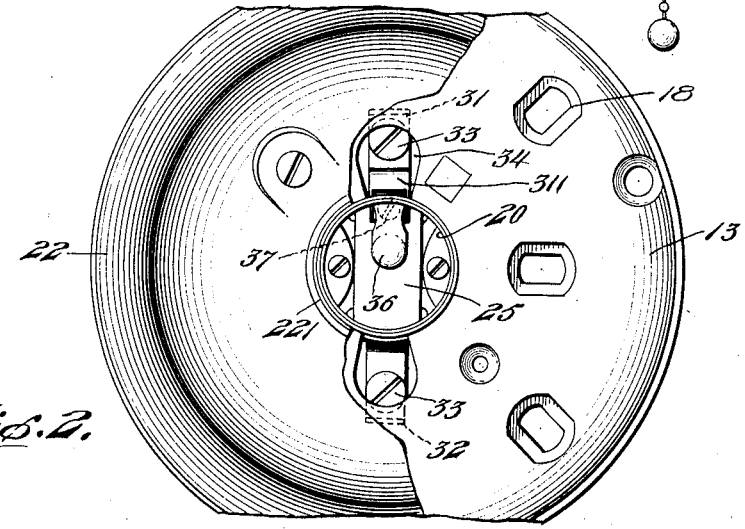
Figure 3:
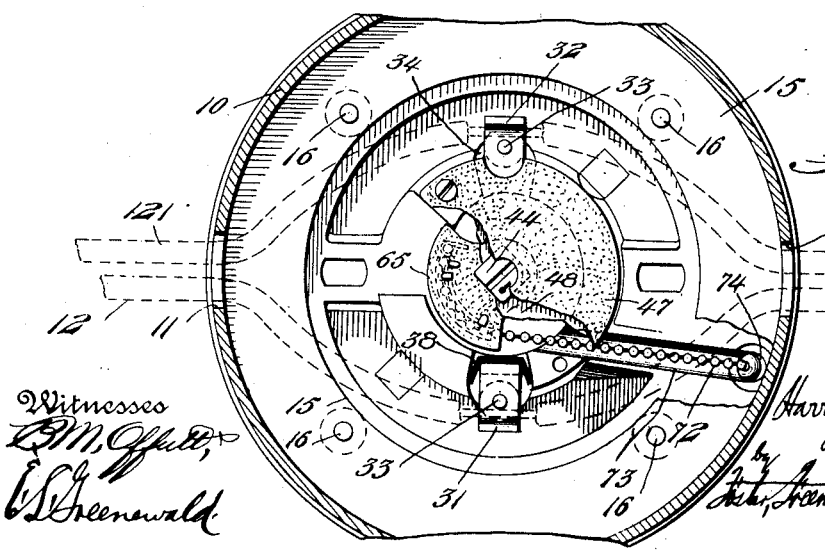

The objects and novel features of the invention will be apparent from the following description taken in connection with the drawing, in which:

Figure 1 shows a side elevation of a receptacle embodying the invention as it appears when mounted on an outlet box, the outlet box being shown in section to disclose the inner side of the receptacle; Fig. 2 is a plan view of the receptacle looking at the socket side of the same, parts being broken away; Fig. 3 is a plan view of the inner side of the receptacle attached to the outlet box and showing the latter in section and some of the parts on the receptacle broken away; Fig. 4 is a central vertical sectional view of the receptacle and the box to which it is attached, on the plane of Fig. 1; Fig. 5 is a plan view of the inner side of the receptacle with part of the switch mechanism removed therefrom; Fig. 6 is a dropped perspective view of certain of the parts comprising the switch mechanism; Fig. 7 is an enlarged perspective view of the ratchet device, operating disk, return spring and supporting pin as permanently assembled.

Referring to the drawing, 10 indicates an outlet box of any ordinary or preferred construction having openings 11 in its walls to admit the line wires 12 and 121 of an electric circuit. The receptacle comprises a base 13 of insulating material such as porcelain or the like and of a suitable shape to correspond to the shape of the opening in the face of the outlet box 10. The inner face of the base 13 is flat and has a portion 14 which is adapted to lie flush with a flange 15 on the outlet box. The base is secured to the box in any suitable manner such as by the screws 16 which pass through openings 17 in the base, the heads of the screws resting on the counter-sunk parts forming the flanges 18 surrounding the said openings. The outer surface of the base 13 is preferably convex and at the center thereof there is a cavity 19 in which the usual screw threaded socket 20 and insulating lining 21 are mounted. The ornamental cap 22 fits on the convex side of the base 13 and has a flange 221 which surrounds and supports the outer end of the lining 21 and screw shell 20.

On the inner side of the base 13 a partially inclosing switch chamber 23 is formed by the circular insulating walls 24 which extend inwardly from the flat face of the base and are formed integral therewith. An insulating barrier 25 separates the cavity 19 from the chamber 23 and on the chamber side of the said barrier a series of four insulating inclines 26, 27, 28 and 29 are formed, integral with the porcelain base, being arranged about a pocket 30 at the center of the barrier or base of the chamber 23. The inclines 26 and 28 are left bare, thus forming insulating seats for the fingers of the switch member while the alternate inclines 27 and 29, disposed oppositely to each other, are provided with copper faces forming switch contacts which are electrically connected when the fingers of the switch member contact therewith.

The terminals 31 and 32 are located on opposite sides of the chamber and have their binding screws 33 arranged at the lower end thereof to engage the line wires 12 and 121, respectively. Openings 34 and 35 are located on opposite sides of the center of the base and extend therethrough, registering with the binding screws 33 so that the line wires 12 and 121 may be secured to the terminals from the outer side of the receptacle as is fully set forth in the patent hereinbefore referred to. The terminal 31 extends into the opening 34 and at its end is bent, as at 311, the bent end and the center lamp contact 36 are fastened to the base at the bottom of the cavity 19 by means of the screw 37. A channel 38 of insulating material fits around the inner side of the terminal 31 so as to more completely insulate the terminal from the other parts of the mechanism and prevent contact of the operating chain therewith. The other lamp contact comprising the screw shell 20 is electrically connected to the switch contact face 27 by means of the screw 39 which extends through the barrier 25. On the opposite side another through screw 391 secures the opposite side of the shell 20 to the barrier 25. The other line terminal 32 is bent to form a flat portion 40 which is seated in a recess 401 in the bottom of the chamber 23 and has the end thereof electrically connected to the tab on the switch contact 29 by means of a screw 41.

A spiral spring 42 is seated in the pocket 30 and is of substantially the same diameter as the said pocket. The spring 42 yieldingly supports the spindle or pin 43 at its lower end. The spindle 43 has a square head 44 at its upper end, the said head being provided with rounded corners, a transverse slot 45 and hole 46, as is clearly shown in Fig. 7. Two plates of insulating material 47 and 48 are secured to the top edge of the walls 24 by means of the screws 49, the top plate 47 having a circular central opening 50 and the lower plate having a square central opening 51, the latter to receive the substantially square head 44 on the end of the spindle 43, said head 44 and opening 51 overlapping the opening 50. The square opening 51, accordingly, provides a locking recess for the different positions of the spindle and the circular opening 50, smaller in size than the square opening, prevents the spindle from moving outwardly and also permits access to the head of the spindle so that a screw driver may be inserted into the slot 45 in order to depress and turn the spindle. It will thus be seen that in order to adjust the tension of the spring 52, which surrounds the spindle and has one end thereof extending through the opening 46 in the spindle, it is only necessary to insert the blade of a screw driver through the opening 50 into engagement with the slot 45 and depress the head out of engagement with the square opening 51 giving the same a quarter of a turn or any number of quarter turns to the required adjustment. The insulating plates 47 and 48 also serve to close the chamber 23 at the top.

The switch member 53 shown in Fig. 6 comprises a single stamping of conducting material provided with a central hub 54 riveted thereto, the hub loosely fitting the spindle 43 and having bearing in an annular depression 55 at the bottom of the chamber 23. The switch member 53 has four oppositely extending arms 56 spaced equal distances about the periphery of the center 57, thus forming a series of four recesses 58 between the arms. Spring contact fingers 59 and 60 are attached to two oppositely disposed arms 56 and are inclined downwardly and curved around the hub as a center so that the bottom faces thereof will in one position simultaneously engage the switch contact faces 27 and 29 and when rotated one quarter turn will ride up the inclined faces and snap onto the insulating inclines 26 and 28.

A ratchet mechanism serves to step the switch member 53 around the spindle 43 so that the fingers 59 and 60 will alternately connect and disconnect the switch contact faces on the inclines 27 and 29. The ratchet mechanism comprises a plate 61 which has the four lugs 62 punched therefrom at its periphery to form a series of teeth 63 corresponding to the recesses 58 between the arms 56 on the switch member, the said teeth engaging into the said recesses and when the ratchet member is rotated serve to step the switch member about the pivot to open and close the circuit. The lower end of the spring is provided with a hook to engage a lip 64 punched from the body of the plate 61, the spring thus serving to retract the ratchet member in a manner well known. The ratchet member or plate 61 is attached to an insulating disk 65, the latter being provided with an opening 66 to receive the spindle and the spring which surrounds it. Two lugs 67 and 68 are formed integral with the plate 61 at opposite sides of the center thereof and when the parts are assembled the lugs 67 and 68 are forced through the insulating disk 65 at opposite sides of the opening therein and clenched thereon to extend toward each other across the opening and terminate adjacent and on opposite sides of the spindle 43, engaging above the lower or one of the lower spirals of the spring 52 so as to retain the spring in position. The lugs 67 and 68 thus serve to prevent the disassembling of the spindle, spring, ratchet member and disk when the switch is taken apart. It is often very annoying to have the smaller parts of the switch fly apart when the device is taken to pieces. The usual chain guide 69 is secured to the under side of the disk 65 by means of the lugs 70 and provided with a clip 71 to receive the last button on the chain and secure the same thereto. The chain 72 is secured at its inner end to the chain guide and fits in the channel thereof and passes out of the switch chamber 23 through a groove 73 formed in the inner face of the base 13. The chain groove 73 extends through the wall of the switch chamber along the flat face of the base to a hole 74 at the outer edge of the base 13, the hole 74 extending through the base at this point and opening at the opposite face of the base in register with a hole and chain funnel 75 on the cover 22. The chain will, thus, depend from the receptacle at a remote distance from the lamp thus not touching or interfering with the latter.

In order to prevent friction and wear of the cord or chain the surface of the guideway comprising the groove 73 and hole 74 is glazed, thus forming a smoother surface than the usual rough surface of porcelain. When using other insulating material the guide-way is likewise smoothened. The chain 72 may be of any desired length and when the flat face of the receptacle is supported flush with the ceiling line indicated by the numeral 76 the lamp or appliance attached to the receptacle will not project below the ceiling as much as the lamps and similar appliances do in the present forms of receptacles and sockets.

The operation of the switch mechanism and advantages of the receptacle will be apparent from the foregoing description. A pull on the chain 72 will move the insulating disk 65 and the ratchet device secured thereto will step the switch member 53 a quarter of a turn. The insulating disk 65 is limited in its forward movement by the corner 651 engaging the projection 652 formed integral with and on the inner side of the wall 24. The disk 65 and toothed plate thereon will be retracted by the spring 52 and the edge 653 will engage the inwardly projecting corner 654 of the wall of the switch chamber and limit the return movement of the disk.

It will be seen that a desirable type of conduit box receptacle has been provided which has numerous advantages. The lamp or plug mounted in the receptacle will project but a slightly greater distance than its length and may be controlled by the pull switch mechanism which is on the same base, practically inclosed, disposed within the conduit box and individual to the receptacle. As numerous modifications will be apparent to those skilled in the art it is not intended to limit the invention to the exact details as shown and described.

Having thus described my invention what I claim is:

1. In a receptacle of the class described, the combination of an insulating base having a cavity approximately at the center of one face thereof, lamp contacts in said cavity, switch mechanism located on the opposite face of the base from the lamp contacts, and means for operating the switch mechanism, the said base having a passageway extending from face to face of the base through which said operating means passes.

2. In an electric appliance, the combination of an insulating base, circuit terminals approximately at the center of one side of said base, switch mechanism on the opposite side of said base, and means for operating said switch mechanism, said base having a guideway to receive and guide said operating means from one side of the base to the opposite side thereof.

3. In a receptacle of the class described, the combination of an insulating base having a cavity and a switch chamber located on opposite sides thereof, lamp contacts secured in the cavity and comprising a shell which has a portion projecting outside the cavity, switch mechanism in said switch chamber, a cap for the outer side of said base having a flange surrounding the projecting portion of said lamp contact shell, and operating means for said switch mechanism extending from the switch chamber through said base and cap to the outer side of the receptacle.

4. In an electric pull switch, the combination of an insulating base of vitreous material, switch mechanism mounted on one side of said base, and a flexible operating member for said switch mechanism, said base having a guideway for said flexible member, said guideway leading from said switch mechanism to the opposite side of said base and having a glazed surface to diminish the friction between said base and the flexible member which slides thereon.

5. The combination with an outlet box or similar support, of a receptacle having a base comprising a cover for the box, a cavity in the outer face of said base, lamp contacts in said cavity, switch mechanism on the inner face of said base and extending into the outlet box, and a pull chain or cord for operating the switch mechanism, said base having an opening extending therethrough remote from said cavity and through which said pull chain passes, whereby said operating chain or cord is disposed so as not to engage the lamp fitted in said cavity.

6. In an electrical receptacle the combination of an insulating base having openings therethrough from the front face to the rear face to receive fastening means for securing the base to a suitable support, said base also having a central cavity in its front face, lamp contacts secured in said cavity, line terminals mounted on said base, said line terminals being disposed within the margin of the base and carrying binding screws accessible from the front of the base to permit the attachment of line wires to the line terminals from the front of the base, switch mechanism on said base for controlling the electrical connection of said line terminals to the lamp contacts, a pull cord for operating said switch mechanism, and means for guiding said pull cord to a point near the edge of the base so that it will depend at a distance from the axis of the base.

7. In a combined incandescent lamp receptacle and cover for an outlet box, the combination of an insulating base capable of serving as a cover for an outlet box, lamp contacts mounted on the outer side of said cover-base, switch mechanism mounted on the inner side of said cover-base, said switch mechanism having parts thereof adapted to extend inside said outlet box when the cover-base is in place on the outlet box, operating means for the switch mechanism, and means for guiding said operating means from the inner side of said base to the outer side thereof.

8. In an electrical appliance, the combination of an insulating base, lamp contacts located substantially at the center of one face of said base, switch mechanism located on the opposite side of said base from the centrally located lamp contacts, means for operating the switch mechanism, and means for guiding said operating means toward the lateral edge of said base and to the opposite side of the base, whereby the operating means will depend from the appliance at a distance from the lamp contacts.

9. In an electrical appliance of the class described, the combination of lamp contacts, switch contacts, an insulating base for supporting said contacts and having a barrier disposed between the contacts, a portion of said base being extended to form a wall which extends about the switch contacts, a switch member adapted to electrically connect the switch contacts, an adjustable pivot for said switch member, and means mounted on the said wall and constructed to maintain the said pivot in its adjusted positions.

10. In an electrical appliance, the combination of an insulating base, supporting means rising from and integral with one face thereof, lamp contacts mounted on the opposite face thereof, switch mechanism located adjacent said supporting means and including a pivot pin having a head, a plate mounted on said supporting means and having an opening therein capable of receiving said head and locking it and the pin in adjusted position, and a member having an opening therethrough of smaller dimensions than the opening in said plate, said opening in said member registering with the opening in said plate to prevent the passage of said head and pin through the opening in the plate but permitting access to said head for the purpose described.

11. In an electric switch, the combination of a pivot pin, a ratchet member, a spring attached to the ratchet member and pivot pin and surrounding the latter, an insulating disk, and means for connecting the insulating disk and ratchet member, said means also coöperating with said spring to prevent the accidental disconnection of the pivot pin, ratchet member, spring and insulating disk from one another so that these parts will remain fastened together as a unit when the switch is taken apart or assembled.

12. In an electric switch, the combination of a pivot pin, a ratchet member through which said pivot pin extends, a retracting spring attached to the pivot pin and ratchet member, an insulating disk having an opening through which said pivot pin extends, and lugs on the ratchet member for attaching the same to the disk, the ends of said lugs engaging the spring and preventing the accidental disconnection of the before-mentioned parts, whereby said pin, ratchet member, disk and spring will remain fastened together as a unit when the switch is taken apart and whereby the switch may be more readily assembled.

13. In a combined electric receptacle and outlet box cover, the combination of a base of insulating material constituting a cover for said box, lamp contacts arranged on one side of said base, switch mechanism mounted on the inner side of said base and adapted to project into the outlet box, binding screws on the inner side of said base and also adapted to project into the outlet box for connecting the receptacle to circuit wires entering the outlet box, and means for operating said switch mechanism.

14. In a receptacle of the class described, the combination of a circular insulating base thicker at the center than at the edges and having a cavity in said thick portion, lamp contacts in said cavity, switch mechanism located on the opposite face of the base from the lamp contacts, a passageway extending through the base remote from said cavity, and an operating cord or chain for operating the switch mechanism, extending through the said passageway and accessible from the side of the base having the cavity therein.

15. In a combined electric receptacle and outlet box cover, the combination of a base of insulating material constituting a cover for an outlet box, said base having a central cavity in the outer side thereof, lamp contacts in said cavity and comprising a screw shell partly projecting from said cavity, switch mechanism mounted on the inner side of said base and adapted to project into the outlet box, binding screws on the inner side of said base and also adapted to project into the outlet box for connecting the receptacle to circuit wires entering the outlet box, said base having openings therethrough registering with the binding screws, a metal cap fitting the outer side of said base, closing said openings registering with the binding screws and having a flange surrounding the projecting portion of the screw shell lamp contact, and a flexible operating device connected to the switch mechanism and extending through said base and cap to the outer side of said receptacle.

16. In an electrical appliance, the combination of an insulating base having openings therethrough from the front face to the rear face to receive fastening means from the front for securing the base to a suitable support, line terminals mounted on said base, said line terminals being disposed within the margin of the base and also being accessible from the front thereof for the connection of line wires thereto, other circuit terminals carried on the front side of said base, a double make-and-break switch mechanism between the line and circuit terminals for controlling the electrical connection of said line terminals to said circuit terminals, a cover for the front face of said base having an opening near its outer edge, and operating means for said switch mechanism comprising a pull cord extending through said opening in the cover and depending from the base at a distance from the axis thereof.

17. In an electric appliance, an insulating base, circuit terminals mounted on said base and carrying binding screws within the margin of the base and accessible from the front of the base for connecting and disconnecting the line wires, a switch member mounted on the base and rotatable around a vertical axis, means for operating said switch member, and a metal shell detachably secured to the front of said base.

In testimony whereof I affix my signature in presence of two witnesses.

HARRY J. MOREY.

Witnesses:
 FAY A. BROGDEN,
 N. A. HURD.